(12) United States Patent
Nobakht et al.

(10) Patent No.: US 9,042,490 B2
(45) Date of Patent: May 26, 2015

(54) SYSTEMS AND METHODS FOR CARRIER PHASE RECOVERY

(75) Inventors: Ramin Nobakht, Laguna Niguel, CA (US); Leonard Alan Plotke, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 13/599,806

(22) Filed: Aug. 30, 2012

(65) Prior Publication Data

US 2014/0064347 A1   Mar. 6, 2014

(51) Int. Cl.
*H04B 17/00* (2006.01)

(52) U.S. Cl.
CPC .................................... *H04B 17/00* (2013.01)

(58) Field of Classification Search
CPC ........................................................ H04B 17/00
USPC .................................. 375/356, 376
See application file for complete search history.

(56) References Cited

U.S. PATENT DOCUMENTS

| | | | |
|---|---|---|---|
| 4,466,109 A | 8/1984 | Sari | |
| 6,549,594 B1 | 4/2003 | Chen et al. | |
| 6,560,303 B1 | 5/2003 | Fan et al. | |
| 7,260,330 B2 | 8/2007 | Chew et al. | |
| 7,526,019 B1 | 4/2009 | Radionov et al. | |
| 7,558,341 B2 | 7/2009 | Han | |
| 7,782,255 B2 | 8/2010 | Sego | |
| 7,801,249 B2 | 9/2010 | Zhidkov et al. | |
| 8,111,770 B1 | 2/2012 | Moon et al. | |
| 2005/0141646 A1 | 6/2005 | Han | |
| 2005/0157820 A1 | 7/2005 | Wongwirawat et al. | |
| 2012/0106611 A1* | 5/2012 | Kim et al. | 375/226 |
| 2012/0106983 A1* | 5/2012 | Xu et al. | 398/208 |

FOREIGN PATENT DOCUMENTS

| | | |
|---|---|---|
| EP | 1201066 A1 | 5/2002 |
| EP | 1241846 A2 | 9/2002 |

OTHER PUBLICATIONS

Kim, "Optimal MMSE Gear-Shifting Algorithm for the Fast Synchronization of DPLL", 1993 IEEE.
European Search Report dated Jan. 8, 2014, Application No. 13180701.8, Applicant: The Boeing Company.

* cited by examiner

*Primary Examiner* — Jaison Joseph
(74) *Attorney, Agent, or Firm* — The Small Patent Law Group, LLC; Joseph M. Butscher

(57) ABSTRACT

Systems and methods for carrier phase recovery are provided. One method includes providing a reference signal, detecting an input signal and determining a Signal to Noise Ratio (SNR) of the input signal. The method also includes employing a Minimum Mean Square Error (MMSE) algorithm based on the SNR to determine a Carrier Phase Recovery Loop (CPRL) bandwidth.

3 Claims, 4 Drawing Sheets

SYSTEMS AND METHODS FOR CARRIER PHASE RECOVERY

BACKGROUND

The present disclosure relates generally to signal transmission in communication systems.

In communication systems, a Carrier Phase Recovery System (CPRS) may be used to estimate and compensate for frequency and phase differences between a carrier frequency of a received signal and a local oscillator frequency of the receiver for non-coherent demodulation. In addition, the CPRS is used to remove phase noise contributions from both the transmitter and the receiver clocks. In an ideal communications system, the carrier frequency and phase of the transmitter and receiver would be perfectly matched, thereby permitting optimum demodulation of the modulated baseband signal.

Obtaining signal lock between the receivers and transmitters can prove to be challenging because the oscillator frequency of the transmitters and receivers are rarely identical as the receivers are usually independent of the transmitters. Each transmitter and receiver has an oscillator with unique frequency and phase characteristics, including phase noise degradation that may be introduced by an oscillator. As a result of this less than ideal relationship between the receivers and transmitters, a number of frequency and phase variations must be estimated using information in the received signals to receive the original transmitted signal and produce acceptable performance.

Optimum selection of the Carrier Phase Recovery Loop (CPRL) bandwidth, B, is especially important in low data rate applications and can significantly impact performance. The choice of CPRL bandwidth impacts performance in the presence of phase noise. This is because narrow loop bandwidth inhibits phase noise tracking, and wide loop bandwidths are more susceptible to thermal noise. Therefore, it is necessary to determine an optimum CPRL bandwidth in order to achieve optimum low data rate performance

SUMMARY

In accordance with one embodiment, a method to determine a CPRL bandwidth is provided. The method includes providing a reference signal, detecting an input signal and determining a Signal to Noise Ratio (SNR) of the input signal. The method also includes employing a Minimum Mean Square Error (MMSE) algorithm based on the SNR to determine a CPRL bandwidth.

In accordance with another embodiment, a demodulator is provided that includes an adaptive CPRL having a PLL configured to detect an input signal. The adaptive CPRL also includes a MMSE module configured to receive as an input phase error vectors based on a phase component of a reference signal and a phase component of the input signal. The phase error vectors define a mean-squared error and the MMSE module is further configured to determine a CPRL bandwidth using the mean-squared error.

In accordance with another embodiment, a communication system is provided that includes a transmitter configured to transmit a modulated signal and a receiver configured to receive the modulated signal. The communication system also includes a demodulator as described above configured to demodulate the received modulated signal.

The features, functions, and advantages that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "at" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of systems and methods described and/or illustrated herein provide carrier signal recovery for signal lock between receivers and transmitters. In different aspects of the systems and methods, adaptive estimates for a selection of a CPRL bandwidth are provided. In some embodiments, a MMSE algorithm is used to determine an optimum CPRL bandwidth for coded and un-coded transmissions. The various embodiments may be used, for example, for any demodulator, which may include land, air, sea, and space applications. The CPRL may reduce demodulated errors caused by phase noise, such as for low-symbol rate signals.

Figure 1:
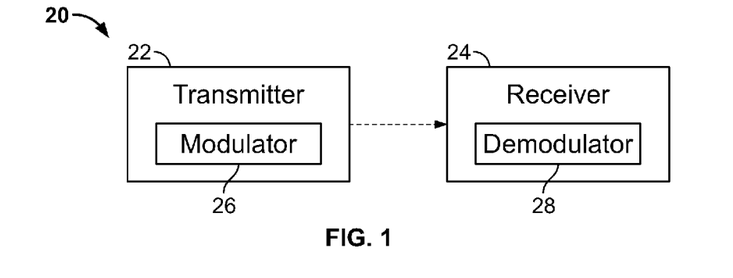
FIG. 1 is a simplified block diagram illustration of a communication system in which various embodiments are implemented.

Various embodiments provide a CPRL, such as for a communication system 20 as shown in FIG. 1 that includes a transmitter 22 communicating with a receiver 24. In some embodiments, the transmitter 22 and receiver 24 are replaced with transceivers capable of both transmission and reception. However, in other embodiments, a separate transmitter 22 and receiver 24 are provided. The communication system 20 may be used to transmit and receive coded and/or un-coded signals.

The transmitter 22 includes a modulator 26 for modulating a signal to transmit. The receiver 24 includes a demodulator 28 for demodulating the modulated signal received from the transmitter 22. The modulation and demodulation performed by the modulator 26 and demodulator 28, respectively, may include using different types of waveform shapes (e.g., raised cosine waveform shape). In operation, the demodulator 28 is used to recover the original transmitted signal from the transmitter 22.

Figure 2:
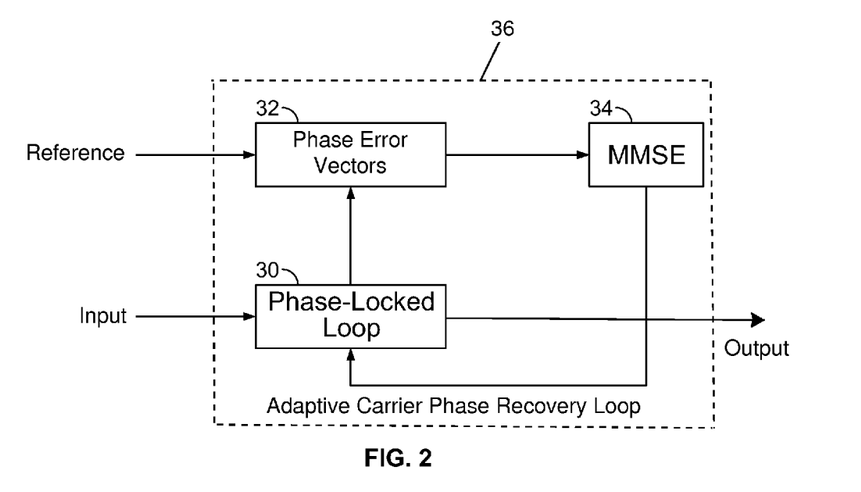
FIG. 2 is a simplified block diagram illustration of a demodulator in accordance with one embodiment.

As shown in FIG. 2, one embodiment includes an adaptive CPRL 36, which may, for example, form part of the demodulator 28 (shown in FIG. 1). The adaptive CPRL 36 includes a Phase-Locked Loop (PLL) 30 that is an electronic control system that generates a signal locked to the phase of an input or reference signal. For example, in various embodiments, the input signal or reference signal may be a complex waveform having both magnitude and phase information, such as a known repeating sequence of symbols that is modulated. This known repeating sequence of symbols is referred to herein as an amble sequence. It should be appreciated that the amble sequence in the various embodiments is the same for both the input signal and the reference signal. The PLL 30 may be any type of PLL device that is configured to recover an original transmitted signal, such as after signal or phase distortion that occurred during transmission of the signal. The PLL 30, thus, operates to lock the receiver into the phase of the input signal.

Various embodiments also use phase error vectors 32 that are based on the reference signal and the output of the PLL 30. The phase error vectors 32 are input to a MMSE module 34. It should be noted that multiple signals may be output from the PLL 30 at different points along the processing sequence of the PLL 30. In the illustrated embodiment, the MMSE module 34, which may be implemented in hardware, software, or a combination thereof, receives as one or more inputs the phase error vectors 32 and has an output connected to the PLL 30. The MMSE module 34 may perform an MMSE algorithm to determine an optimal CPRL bandwidth for coded and/or un-coded transmissions.

Figure 3:
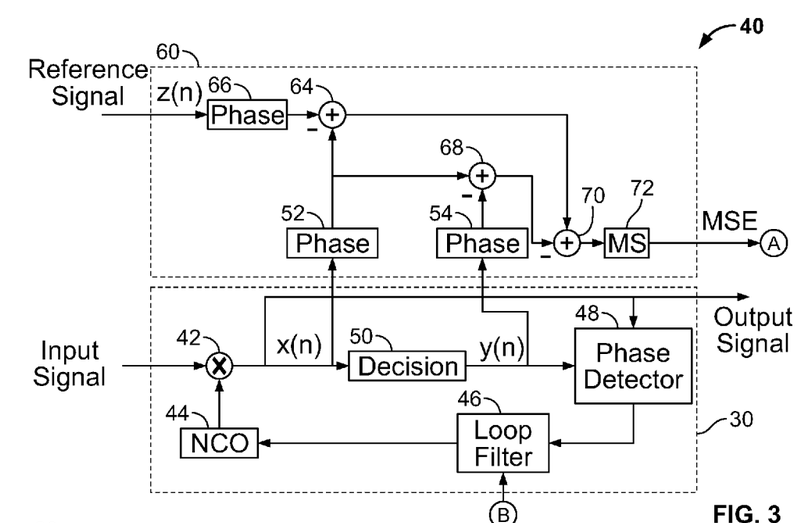
FIG. 3 is a schematic illustration of a CPRS in accordance with one embodiment.
Figure 4:
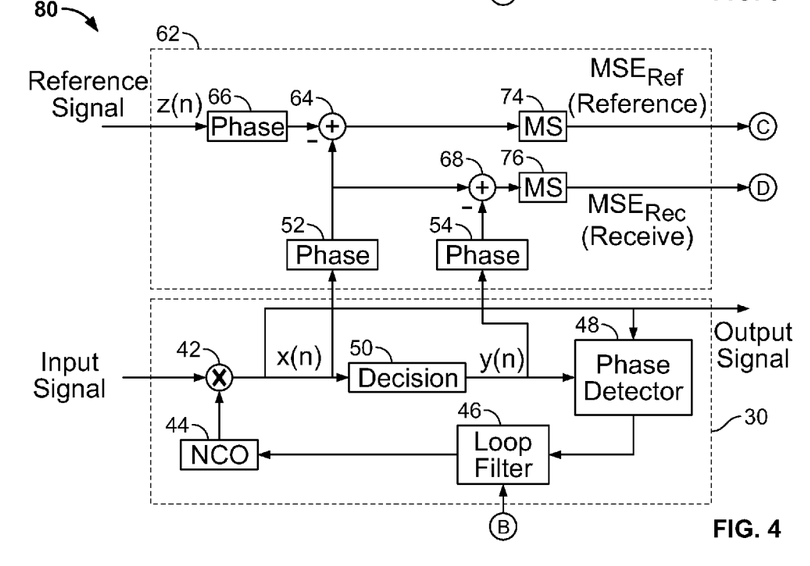
FIG. 4 is a schematic illustration of a CPRS in accordance with another embodiment.

In various embodiments, the configuration for the MMSE module 34 is different for processing coded and un-coded transmissions. In particular, FIGS. 3 and 4 illustrate different embodiments of a CPRL System Model and MMSE algorithm that may be implemented using the MMSE module 34. The configuration of FIG. 3 is used for coded signals and the configuration of FIG. 4 is used for un-coded signals. For example, a CPRS 40 shown in FIG. 3 is used for waveforms that are transmitted at lower signal-to-noise ratios (SNR), which is generally the case where the waveforms are coded with some form of forward-error correction (FEC). A CPRS 80 of FIG. 4 is used for waveforms that are transmitted at higher SNR, which is generally the case for waveforms that are un-coded. In various embodiments, the CPRL bandwidth may be optimized for a plurality of waveforms.

Figure 5:
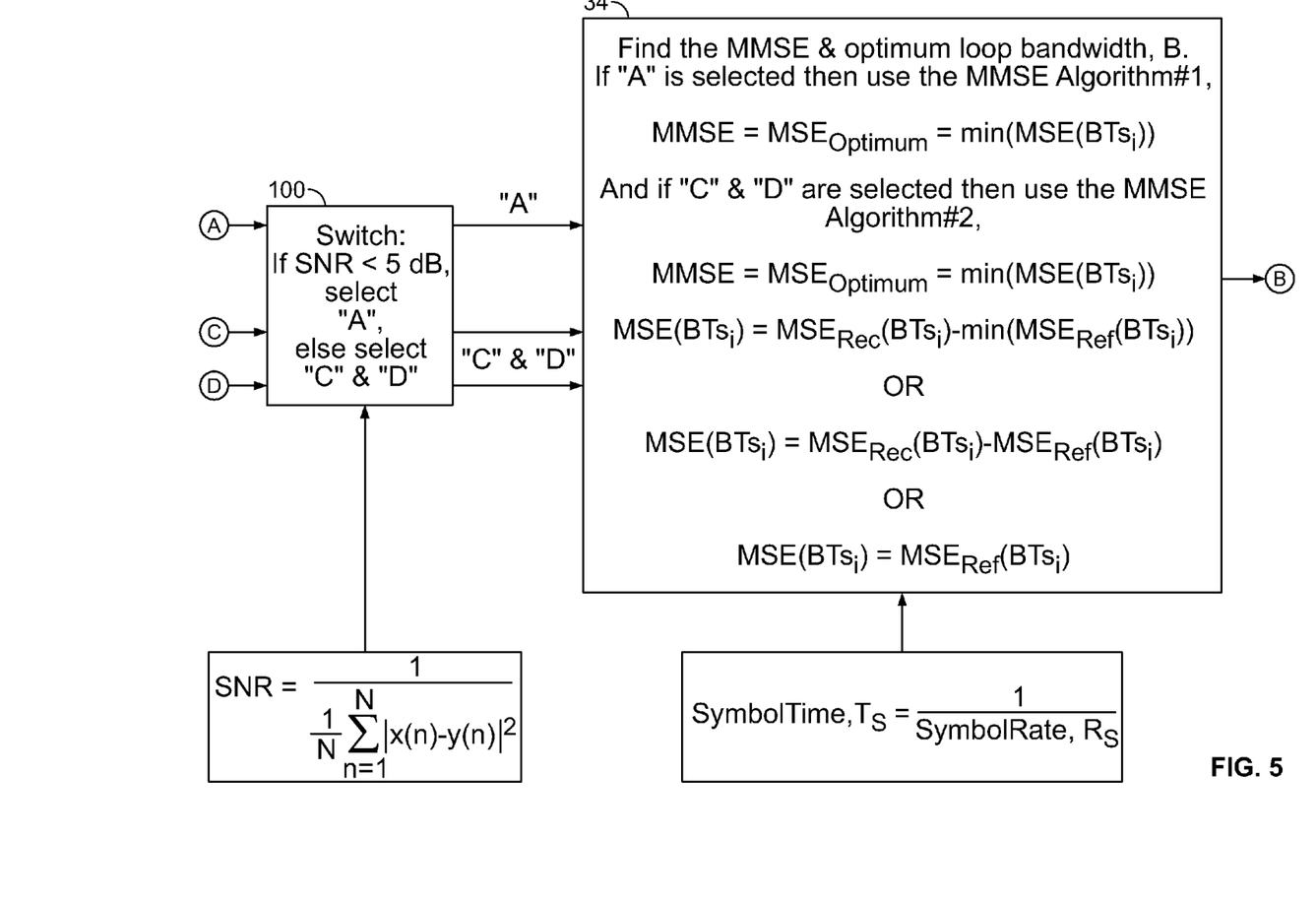
FIG. 5 is a block diagram illustrating MMSE operations performed in accordance with various embodiments.

An SNR threshold value may be used to define whether the SNR is higher or lower than a predetermined or defined value. Other criteria or factors additionally or alternatively may be used, such as whether the signals are coded or un-coded. Accordingly, the SNR threshold value may be variable and/or predetermined or defined. In one embodiment, the SNR threshold value is 5 decibels (dB). In this embodiment, if the SNR is less than 5 dB then the CPRS 40 is selected and if the SNR is greater than or equal to 5 dB then the CPRS 80 is selected. The SNR threshold value may be greater or less than 5 dB (which may be significantly lower or higher) in other embodiments, for example, based on system or communication requirements. In one embodiment, as shown in FIG. 5, a selector 100 is provided that selects the output from either the CPRS 40 or the CPRS 80 based on the SNR of the signal. The output from the CPRS 40 or the CPRS 80 is then processed by the MMSE module 34. For example, the MMSE module 34 may select an MMSE algorithm as described herein based on whether the output is from the CPRS 40 or the CPRS 80. The selected MMSE algorithm is used in various embodiments to determine an optimum CPRL bandwidth for the transmission. For example, a desired decision model based on a predetermined SNR may be determined for use in calculating the MMSE.

With respect to FIG. 2 through FIG. 6, Table 1 below includes a list of terms that may be used. Table 1 includes the term, a corresponding symbol or acronym (if any) as used herein and a description of the term for various embodiments. It should be realized that Table 1 is merely used to facilitate a general understanding of the terms and is not limiting.

TABLE 1

| Term | Symbol | Description |
| --- | --- | --- |
| BTs | | The product of the CPRL loop bandwidth, B, and the symbol time, Ts. |
| $BTs_i$ | | The $i^{th}$ value of BTs from 0.0001 to 1.0; the minimum value is variable (>0) while the maximum value is 1.0. |
| Carrier Phase Recovery Loop | CPRL | A carrier phase recovery loop is used to estimate and compensate for frequency and phase differences between a received signal's carrier frequency and the receiver's local oscillator phase and frequency for the purpose of non-coherent demodulation. |
| CPRL Loop Bandwidth | B | The loop bandwidth of the CPRL |
| Decision | | The Decision function selects the constellation coordinate that reflects the minimum distance between the received symbol coordinate and the nearest constellation coordinate. The output of the Decision function is a sequence of symbols represented by $y(n) = y_n e^{j\phi_n}$, where y(n) is the $n^{th}$ discrete value in a continuous stream of values at a rate of Rs. |
| Input Signal | | The Input Signal (or received signal) contains a known, repeating sequence of symbols which is modulated. This known repeating sequence of symbols is referred to herein as an amble sequence. This same repeating sequence of symbols is likewise found in the Reference Signal. It is presumed that this repeating sequence of symbols is aligned such that there can be a symbol-by-symbol comparison between each symbol in the Reference Signal and the Input Signal. Input Signal is a stream of modulated symbols running at a symbol rate, $R_s$ |
| Loop Filter | | The Loop Filter, filters the output sequence from the Phase Detector. |
| Mean-Squared function | MS | A phase or combination of phases is input into the MS function, then squared, then summed over N samples, and then divided by N samples, such that the output is, $$MS = \frac{1}{N}\sum_{n=1}^{N}(Phase)^2$$ |

TABLE 1-continued

| Term | Symbol | Description |
|---|---|---|
| Mean-Squared Error | MSE | Mean-squared error for FIG. 1 is, $MSE = \frac{1}{N}\sum_{n=1}^{N}(\phi_n - \psi_n)^2$ which can be found over values for BTs from approximately 0.0001 up to 1.0, and the MSE for FIG. 2 is, $MSE(BTs_i) = MSE_{Rec}(BTs_i) - \min(MSE_{Ref}(BTs_i))$ over values for BTs from approximately 0.0001 up to 1.0. |
| Mean-Squared Error received | $MSE_{Rec}$ | $MSE_{Rec} = \frac{1}{N}\sum_{n=1}^{N}(\theta_n - \phi_n)^2$ |
| Mean-Squared Error reference | $MSE_{Ref}$ | $MSE_{Ref} = \frac{1}{N}\sum_{n=1}^{N}(\theta_n - \psi_n)^2$ |
| Minimum Mean-Squared Error | MMSE | In the presence of noise (thermal and phase), the minimum mean-squared error is the optimum MSE achieved such that, $MMSE = MSE_{Optimum} = \min(MSE(BTs_i))$. For a given symbol time, Ts, this is achieved by selecting an optimum bandwidth, B, for the CPRL. |
| Numerically Controlled Oscillator | NCO | The output of the NCO is a phase correction estimate that is used to correct the Input Signal. |
| | N | Number of symbols used to determine the MMSE |
| Output Signal | | The phase of the Input Signal is corrected by the phase correction estimate from the NCO, and results in the Output Signal, $x(n) = x_n e^{j\theta_n}$, where $x(n)$ is the $n^{th}$ discrete value in a continuous stream of values at a rate of Rs. |
| Phase function | | The output of the Phase function is the phase component of the complex input to the Phase function. For example, if the input signal to the Phase block is the Reference Signal, $z(n) = z_n e^{j\psi_n}$, then the output of the Phase function will be $\psi_n$. |
| Phase Detector | | The output of the Phase Detector is a numerical representation of an estimated phase difference between $x(n)$ and $y(n)$ |
| Reference Signal | | The Reference Signal contains a known sequence of symbols such that $z(n) = z_n e^{j\psi_n}$, where $z(n)$ is the $n^{th}$ discrete value in a continuous stream of values at a rate of Rs. This known repeating sequence of symbols is referred to herein as an amble sequence. This same sequence of symbols is likewise found in the Input Signal. It is presumed that this sequence of symbols is aligned such that there can be a symbol-by-symbol comparison between each symbol in the Reference Signal and the Input Signal. The Reference Signal is a stream of symbols running at a symbol rate, Rs. |
| Signal-to-Noise Ratio | SNR | The $SNR = \dfrac{1}{\frac{1}{N}\sum_{n=1}^{N}|x(n)-y(n)|^2}$, assuming that the input signal is normalized to 1 Watt. |
| Symbol Rate (symbols/sec) | Rs | Symbol rate is the rate at which the symbol changes per unit time. The Symbol Rate is the reciprocal of the Symbol Time, Ts, such that, $Rs = \frac{1}{Ts}$. |
| Symbol Time (sec) | Ts | $Ts = \frac{1}{Rs}$ |

Following is a description of the PLL 30, which may be implemented in different configurations and arrangements. In the various embodiments and Figures, like numerals represent like parts as described herein. The PLL 30 includes a mixer 42 that receives the input signal and an oscillator signal, which in the illustrated embodiment is generated by a Numerically Controlled Oscillator (NCO) 44. The NCO 44 is connected to a loop filter 46, which is connected to a phase detector 48. The output of the phase detector 48 connected through the loop filter 46 and the NCO 44 to the mixer 44 form a feedback loop of the PLL 30.

The output of the mixer 42 is connected to a decision module 50, the output of which is connected to the phase detector 48. In operation, the phase detector outputs a numerical representation of an estimated phase difference between the signal $x(n)$ input to the decision module 50 and the signal $y(n)$ output from the decision module 50. The output of the phase detector 48 is fed through the feedback loop with the loop filter filtering the output sequence from the phase detector 48. The filtered output from the loop filter 46 is provided to the NCO 44, which outputs a phase correction estimate used to correct the input signal. Thus, the PLL 30 responds to a frequency and/or phase of the input signal until the frequency and/or phase of the output signal is matched to the frequency and/or phase of the reference signal. The decision module 50 may be configured to select a constellation coordinate that reflects the minimum distance between the received symbol coordinate and the nearest constellation coordinate.

The PLL 30 may be implemented in different configurations and the components of the PLL 30 are merely for illustration. The PLL 30 may be any type of PLL device that performs PLL operations as described herein.

As can be seen in both FIGS. 3 and 4, two signals from the PLL 30 are provided to create the Phase Error Vectors 32 (shown in FIG. 2). In the illustrated embodiment, the $x(n)$ and $y(n)$ signals are output from the PLL 30 and the phase components from the signals extracted by the phase functions 52 and 54, respectively. For example, the output of the phase functions 52 and 54 are the phase components of the complex input signal to the phase functions 52 and 54, which includes both magnitude and phase. It should be noted that when reference is made herein to a function within the various embodiments, the function may be a hardware component operating to perform the function, a software component to perform the function, or a combination thereof.

In the illustrated embodiments, a Phase Error Vector function 60 in the CPRS 40 generates a single output signal (combined signal) and the Phase Error Vector function 62 in the CPRS 80 generates two output signals. It should be noted that the Phase Error Vector functions 60 and 62 may be implemented in hardware, software, or a combination thereof, and may be, for example, one or more modules. It should be noted that the Phase Error Vector function 60 and/or the Phase Error Vector function 62 may be embodied or implemented as the adaptive CPRL 36 (shown in FIG. 1). In both the Phase Error Vector function 60 and the Phase Error Vector function 62, a summer 64 is connected to the phase function 52 and to a phase function 66, which outputs the phase component of the reference signal z(n). In operation, the negative of the phase component of the reference signal is summed with the phase component of the x(n) signal, effectively subtracting the phase component of the reference signal from the phase component of the x(n) signal.

Additionally, in both the Phase Error Vector function 60 and the Phase Error Vector function 62, a summer 66 is connected to the outputs of the phase functions 52 and 54. In operation, the negative of the phase component of the y(n) signal is added to the phase component of the x(n) signal, effectively subtracting the phase component of the y(n) signal from the phase component of the x(n) signal. In the Phase Error Vector function 60, the outputs from the summers 64 and 68 are also connected to a summer 70. In operation, the negative of the output of the summer 68 is added to the output of the summer 64 to generate a single signal. The output of the summer 70, Phase, is connected to mean-squared MS function (MS) 72. In operation the summed phases (or phase components) output from the summers 64 and 68, Phase, are input to the MS 72, which is squared, then summed over N samples and then divided by N samples, such that the output is:

$$MS = \frac{1}{N} \sum_{n=1}^{N} (\text{Phase})^2$$

The output of the MS 72 is a mean-squared error that is input to the MMSE 34. In the CPRS 40, the MSE output is:

$$MSE = \frac{1}{N} \sum_{n=1}^{N} (\phi_n - \psi_n)^2$$

The MSE output from the MS 72 may be determined over a plurality of values BTs, which is the product of the CPRL loop bandwidth, B, and a symbol time, Ts (where Ts=1/Rs and Rs is the symbol rate at which the symbol changes per unit time). The range of BTs may be varied. In one embodiment, the values for the BTs are determined from approximately 0.0001 to 1.0, with defined increments (e.g., 0.05 or 0.1 increments). However, the range may have a higher or lower starting or ending point and the increments may be defined based on the number of samples to be used.

In the Phase Error Vector function 62, the outputs of the summers 64 and 68 are connected to an MS 74 and an MS 76, respectively, which performs a similar function to the MS 72 as described above. The outputs of the MS 74 and the MS 76 are mean-squared errors that are input to the MMSE 34. In particular, the output of the MS 74 is a mean-squared error of the reference signal:

$$MSE_{Ref} = \frac{1}{N} \sum_{n=1}^{N} (\theta_n - \psi_n)^2$$

and the output of the MS 76 is a mean-squared error or the received signal:

$$MSE_{Rec} = \frac{1}{N} \sum_{n=1}^{N} (\theta_n - \phi_n)^2$$

The $MSE_{Ref}$ and the $MSE_{Rec}$ output from the MS 74 and the MS 76, respectively, may be determined over a plurality of values BTs. The range of BTs may be varied. In one embodiment, the values for the BTs are determined from approximately 0.001 to 1.0, with defined increments. However, the range may have a higher or lower starting or ending point and the increments may be defined based on the number of samples to be used.

In operation, the selector 100 selects the signal to communicate to the MMSE 34 based on an SNR threshold, which is 5 dB in one embodiment. Accordingly, if the SNR is less than 5 dB, the output signal MSE from the MS 72 of the Phase Error Vector function 60 is input to the MMSE 34. If the SNR is greater than or equal to 5 dB, the output signals $MSE_{Ref}$ and the $MSE_{Rec}$ from the MS 74 and the MS 76, respectively, of the Phase Error Vector function 62 are input to the MMSE 34. Thus, in various embodiments, the demodulator 28 (shown in FIG. 1) includes both the CPRS 40 and the CPRS 80 with the signal to be processed determined based on an SNR, which in one embodiment is measured as follows (assuming that the measured input signal is normalized to 1 Watt):

$$SNR = \frac{1}{\frac{1}{N} \sum_{n=1}^{N} |x(n) - y(n)|^2}$$

As can be seen in FIG. 5, a different MMSE algorithm is used depending on whether the output of the Phase Error Vector function 60 or the outputs of the Phase Error Vector function 62 are selected by the selector 100. For example, if the output from the Phase Error Vector function 60 is selected then the MMSE and optimum loop bandwidth is determined as the minimum of the MSE for the determined values of the BTs, which may be defined as: MMSE=$MSE_{Optimum}$=min (MSE(BTs$_i$)).

If the output from the Phase Error Vector function 62 is selected, then the MMSE and optimum loop bandwidth may be determined using different MMSE methods or calculations. For example, the MMSE may be determined similar to the MMSE for the output of the Phase Error Vector function 60, such that MMSE is the minimum of the MSE for the determined values of the BTs. Alternatively, the MMSE may be determined as the difference between the MSE of the received signal ($MSE_{Rec}$) and the minimum of the MSE of the reference signal ($MSE_{Ref}$) as follows: MSE(BTs$_i$)=$MSE_{Rec}$(BTs$_i$)−min($MSE_{Ref}$ (BTs$_i$)). In another embodiment, the MMSE may be determined as the difference between the MSE of the received signal ($MSE_{Rec}$) and the MSE of the reference signal ($MSE_{Ref}$) as follows: MSE(BTs$_i$)=$MSE_{Rec}$−$MSE_{Ref}$(BTs$_i$). In yet another embodiment, the MMSE may be determined as the MSE of the reference signal ($MSE_{Ref}$) as follows: MSE(BTs$_i$)=$MSE_{Ref}$ (BTs$_i$). Thus, variations are possible, such as based on the processing resources.

The output of the MMSE 34 is connected to the loop filter 46 of the CPRS 40 or the CPRS 80. Thus, estimates may be determined from the noise in the system (e.g., phase noise characteristics at a given moment in time).

Figure 6:
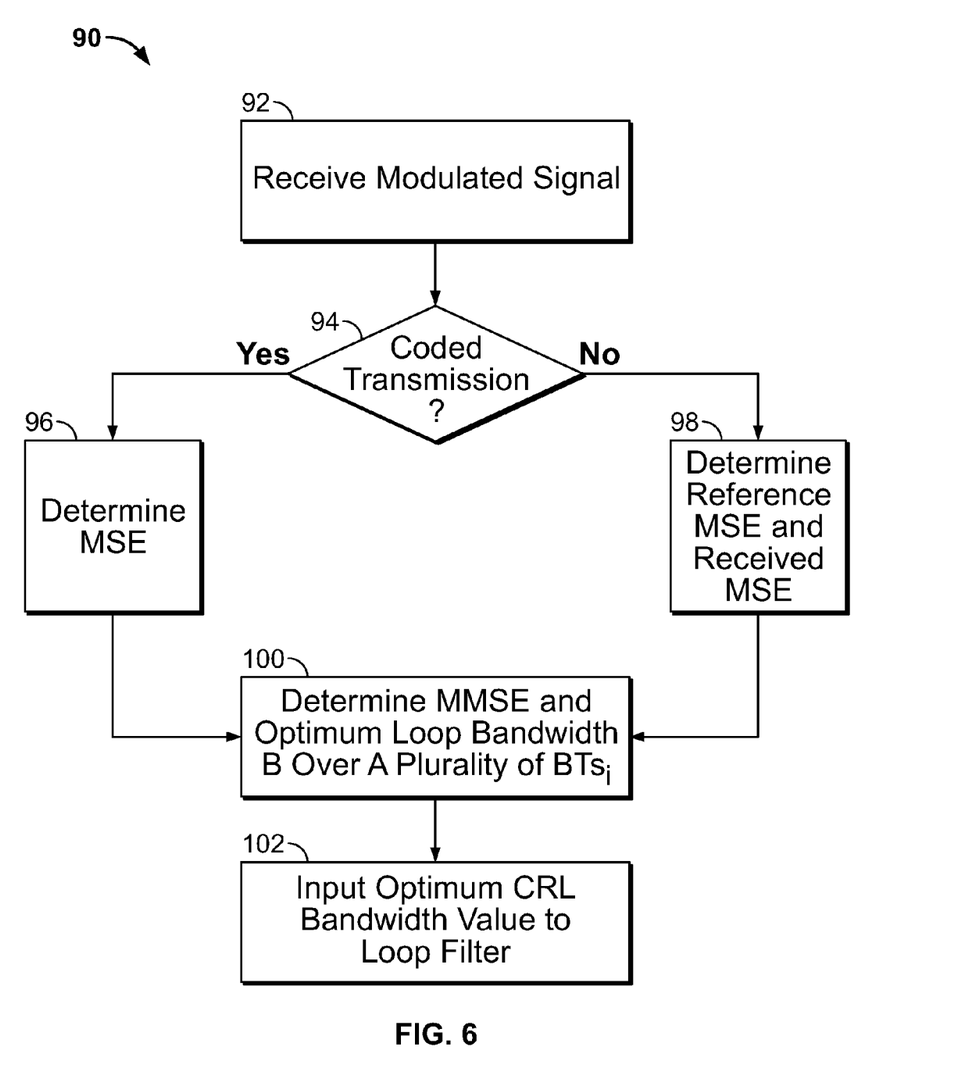
FIG. 6 is an illustration of operations performed by one embodiment to determine an MMSE.

Various embodiments also provide a method 90 as shown in FIG. 6 for determining an optimum CPRL bandwidth. In particular, the method 90 includes receiving a modulated signal at 92. For example, a demodulator of a receiver receives a modulated signal. A determination is then made at 94 as to whether the transmission is a coded transmission. If the transmission is coded, then a combined MSE is determined at 96. If the transmission is un-coded, then the reference MSE and the received MSE is determined at 98. The MSEs may be determined by the CPRLs as described in more detail herein by providing a reference signal and detecting an input signal. Using the determined MSEs, an MMSE and optimum loop bandwidth over a plurality of $BTs_i$, which is the product of the CPRL loop bandwidth and the symbol time, is determined. Based on the MMSE calculations, an optimum CPRL bandwidth value is provided to a PLL, for example, the loop filter 46 of the PLL 30.

Accordingly, for a given Ts, the MMSE may be determined by changing B (e.g., incrementally changing) over a series of $BTs_i$ where, in one embodiment, i=1, 2, . . . m, and $BTs_1$=0.0001 and $BTs_m$=1.0. The MMSE is calculated as described herein as a function of SNR. It should be noted that the MMSE Algorithm may be simplified in order to reduce computational resources as described herein.

Additionally, the optimization of B is performed for each waveform, where a communication waveform may vary as a function of frequency, symbol rate, data rate, FEC, modulation format (e.g., BPSK, QPSK, etc.), and other factors. By using one or more embodiments, the optimization of B can be performed for calibration and initialization of a waveform for a given communications channel either one-time, on a determined schedule, or continuously. It should be noted that the loop filter 46 may be designed such that B is optimized and set on a one-time basis such as in the case of an analog filter design, or the loop filter 46 may be designed such that B is variable, such as in the case of a filter formed via a digital signal processor.

Thus, various embodiments provide for selection of a CPRL bandwidth based on a measured phase noise. In various embodiments, a theoretical bandwidth is, thus, not assumed.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective tuts "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A demodulator comprising:
   an adaptive Carrier Phase Recovery Loop (CPRL) including:
      a Phase-Locked Loop (PLL) configured to detect an input signal; and
      a Minimum Mean Square Error (MMSE) module configured to receive as an input phase error vectors based on a phase component of a reference signal and a phase component of the input signal, the phase error vectors defining a mean-squared error, the MMSE module further configured to determine a CPRL bandwidth using the mean-squared error, wherein the MMSE module is configured to determine an MMSE algorithm to use based on a predetermined SNR threshold value, and wherein the MMSE module determines a difference between a mean-squared error of the input signal and a minimum of a mean-squared error of the reference signal over a plurality of values for a product of the CPRL bandwidth and a symbol time if the SNR of the input signal is greater than a predetermined value.

2. A demodulator comprising:

an adaptive Carrier Phase Recovery Loop (CPRL) including:
- a Phase-Locked Loop (PLL) configured to detect an input signal; and
- a Minimum Mean Square Error (MMSE) module configured to receive as an input phase error vectors based on a phase component of a reference signal and a phase component of the input signal, the phase error vectors defining a mean-squared error, the MMSE module further configured to determine a CPRL bandwidth using the mean-squared error, wherein the MMSE module is configured to determine an MMSE algorithm to use based on a predetermined SNR threshold value, and wherein the MMSE module determines a difference between a mean-squared error of the input signal and a mean-squared error of the reference signal over a plurality of values for a product of the CPRL bandwidth and a symbol time if the SNR of the input signal is greater than a predetermined value.

3. A demodulator comprising:

an adaptive Carrier Phase Recovery Loop (CPRL) including:
- a Phase-Locked Loop (PLL) configured to detect an input signal; and
- a Minimum Mean Square Error (MMSE) module configured to receive as an input phase error vectors based on a phase component of a reference signal and a phase component of the input signal, the phase error vectors defining a mean-squared error, the MMSE module further configured to determine a CPRL bandwidth using the mean-squared error, wherein the MMSE module is configured to determine an MMSE algorithm to use based on a predetermined SNR threshold value, and wherein the MMSE module determines a minimum of a mean-squared error of the reference signal over a plurality of values for a product of the CPRL bandwidth and a symbol time if the SNR of the input signal is greater than a predetermined value.

* * * * *